United States Patent

Guala

[15] 3,707,247

[45] Dec. 26, 1972

[54] LIQUID MEASURING AND DISPENSING BOTTLE CLOSURE DEVICE

[72] Inventor: Piergiacomo Guala, Alessandria, Italy

[73] Assignee: Societa Angelo Guala di Piergiacomo E. Roberto Guala & C. S.a.S., Alessandria, Italy

[22] Filed: Sept. 21, 1971

[21] Appl. No.: 182,497

[30] Foreign Application Priority Data

Sept. 23, 1970 Italy..................................70189 A/70
July 16, 1971 Italy...................................69408 A/71

[52] U.S. Cl. ....................222/188, 222/416, 222/454
[51] Int. Cl. ................................................B67d 3/18
[58] Field of Search......222/188, 416, 442, 443, 444, 222/454, 455, 456, 457, 566, 567

[56] References Cited

UNITED STATES PATENTS 2,208,862  7/1940  Stringfellow ........................222/188
3,081,008  3/1963  Hestier...............................222/416

Primary Examiner—Robert B. Reeves
Assistant Examiner—Larry Martin
Attorney—Richard C. Sughrue et al.

[57] ABSTRACT

This invention provides an improved liquid measuring and dispensing closure device having axial symmetry and including a tubular body with an internal lock chamber which communicates with the interior of the bottle by way of a narrow coaxial vent tube, the lock chamber also communicating by way of an annular aperture with a first annular coaxial passage which connects the interior of the bottle with a pouring opening. During pouring liquid flows into the lock chamber through a second annular coaxial passage, narrower than the first, and also through the pouring opening until the liquid in the lock chamber closes off the vent tube, direct flow of air into the bottle through the first passage being prevented, and the axial symmetry of the stopper permitting its effective use in any orientation of the bottle.

12 Claims, 9 Drawing Figures

LIQUID MEASURING AND DISPENSING BOTTLE CLOSURE DEVICE

This invention relates to measuring and dispensing bottle closure devices.

Two basic types of measuring and dispensing closure devices or stoppers are known, these having in common a lock chamber communicating with a vent tube which extends into the bottle for letting air into the latter. Pouring out of liquid from the bottle is stopped automatically by hydraulic closing of the vent tube, after the contents of the lock chamber have been dispensed, whereupon the lock chamber refills with liquid.

One known type of measuring and dispensing closure device, exemplified by U.S. Patent specification No. 2,208,862 and French Patent specification No. 995,650 has a vent tube which extends into a collection chamber for the liquid poured out, communicating with an outlet opening the cross section of which is less than the aperture which communicates with the interior of the bottle and which communicates with the atmosphere through another aperture; the vent tube leads into a separate lock chamber located within the collection chamber and connected to the latter in such manner that the liquid commences to flow into the vent tube after having filled a portion of the collection chamber.

A second known type of measuring and dispensing closure device, with which the present invention is particularly concerned, exemplified by D B P No. 1,152,910 has a body adapted to fit into the neck of the bottle and provided with an opening for pouring out the liquid, a lock chamber communicating with the atmosphere into which one end of a vent tube penetrates for admitting air into the bottle during pouring, a first passage in the body for connecting the interior of the bottle with the said pouring opening, and a second passage of smaller cross section for connecting the inside of the bottle with the lock chamber, whereby during pouring the liquid flows into the lock chamber and through the pouring opening, until the liquid which collects in the lock chamber brings about hydraulic closure of the vent tube, preventing further air from entering the bottle, means being provided to prevent flow of air into the bottle through the first passage.

Measuring and dispensing closure devices or stoppers of the second type will be referred to herein as "measuring and dispensing closure devices of the type described."

Measuring and dispensing closure devices of the type described have the following advantages in relation to those of the first-mentioned type:

1. a shorter pouring-out time for a given measured quantity to be poured;

2. pouring-out times do not vary according to the angle of the bottle during pouring;

3. lesser overall size for a given measured quantity and performance.

The measuring and dispensing closure device of the type described has the disadvantage that its performance varies with the orientation of the bottle around its own axis, obliging the user to pay particular attention at every pouring-out to the orientation of the bottle. This militates against swift service, and could leave the way open to fraud at the customer's expense.

Secondly, the measuring and dispensing closure device of the type described is not suitable for industrial mass production.

An object of the present invention is to provide a measuring and dispensing closure device of the type described which is capable of supplying precise measures of liquid irrespective of the orientation of the bottle upon its axis during pouring of liquid therefrom.

The present invention provides a solution to this problem by providing all the component elements of the measuring and dispensing closure device with substantial axial symmetry with respect to its longitudinal central axis.

More particularly, the invention provides a measuring and dispensing closure device for bottles, comprising a tubular body having axial symmetry, a vent tube coaxial with said body and adapted to extend into a bottle to admit air into the latter, said vent tube communicating with a coaxial lock chamber within said body which communicates by way of an annular aperture coaxially surrounding the vent tube with a first annular passage adapted to connect the interior of the bottle to a pouring opening, a second annular passage, of smaller cross-section than the first passage, adapted to connect the interior of the bottle with the lock chamber, said first and second annular passages being coaxial with the body, and means in the annular space between the body and the vent tube for preventing flow of air into the bottle through the first passage, whereby during pouring liquid flows from the bottle into the lock chamber and also through the pouring opening, until the vent tube is closed by liquid in the lock chamber to prevent further air from entering the bottle.

The invention will be further described, by way of non-limiting example, with reference to the accompanying drawings, in which.

The same reference numerals are used throughout to denote the same or corresponding component parts in the various embodiments.

Figure 1:
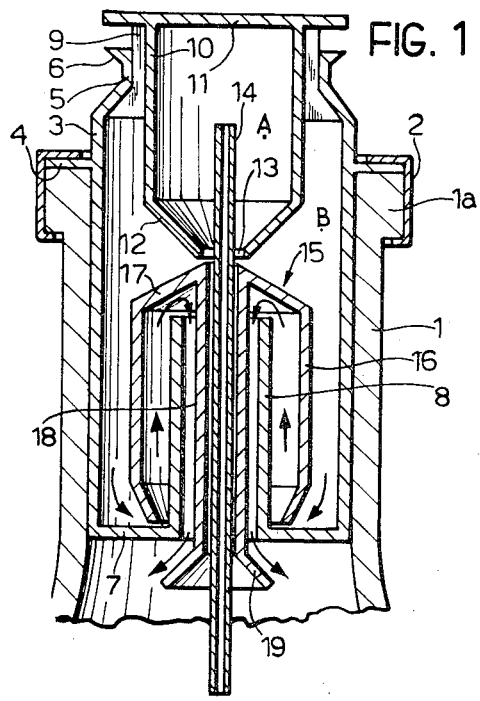
FIG. 1 is a diagrammatic axial section of a measuring and dispensing closure device according to one embodiment of the invention, fitted to the neck of a bottle.

Referring first to FIG. 1 there is shown the neck 1 of a bottle having an external annular rim 1a to which is affixed, for example by means of a claw clip 2, a measuring and dispensing closure device according to the invention.

Figure 2:
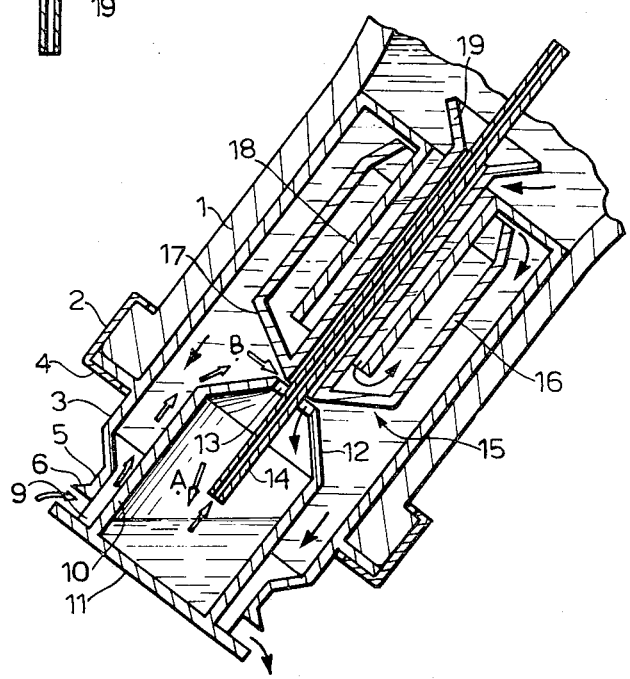
FIG. 2 shows the closure device and the bottle of FIG. 1 in an inclined pouring-out position.

In the embodiment illustrated in FIGS. 1 and 2 the measuring and dispensing closure device consists of a hollow cylindrical body 3 which fits into the neck 1 and projects outwardly therefrom. The body 3 has an external annular flange 4 which when the closure device is fitted is engaged by the claw clip 2 and held thereby against the mouth of the bottle 1.

The outwardly projecting part of the body 3 has a narrow portion 5 of relatively small diameter terminating at its outer end in a shaped, drip-catching annular lip 6. the inner end of the body 3 is closed by an annular transverse wall 7 which carries a tube 8 coaxial with the body 3 and extending inside the latter.

Within the narrow portion 5 of the body 3 there is supported, by means of radial guide vanes 9, a cylindrical wall 10 coaxial with the body 3 which projects outwardly beyond the annular lip 6 and carries at its outer end a circular cover plate 11. The plate 11 has a larger diameter than the wall 10, its peripheral portion being spaced from the annular lip 6 and forming with the latter an annular pouring opening. The cylindrical wall 10 terminates at its inner end within the body 3 in a frusto-conical portion 12 having a central aperture 13.

The wall 10, with the frusto-conical portion 12 and the plate 11, defines a lock chamber A. A small diameter vent tube 14 enters the chamber A through the aperture 13, with radial clearance therein. The purpose of the vent tube 14 is to permit air to enter the bottle during pouring-out of the liquid, the latter flowing out through the annular clearance space in the opening 13 surrounding the tube 14 and coaxial therewith.

Within the hollow body 3, inwardly of the opening 13, there is placed an element 15 having a hollow cylindrical portion 16, coaxial with the body 3, which extends almost to the transverse wall 7. The portion 16 is formed with a frusto-conical outer end portion 17 carrying an internal tube 18 which extends with radial clearance coaxially within the tube 8 borne by the wall 7 and surrounds coaxially with radial clearance the vent tube 14. The tube 18 terminates at its inner end in a flared mouth 19 inwardly of the wall 7. The element 15 forms, together with the tube 8 and the transverse wall 7, a syphon device which forms part of a first annular passage, coaxial with the body 3, through which liquid flows from the bottle during pouring-out, and through which liquid remaining in the closure device flows to return to the bottle when the latter resumes the upright position. Between the vent tube 14 and the surrounding tube 18, there are interposed longitudinal spacing fins, (not shown), borne by at least one of the tubes, which ensure and maintain the coaxiality of the said tubes.

An annular dispensing chamber B forming part of the first annular passage is defined within the body 3 between the wall 10, the element 15 and the internal surface of the body 3.

The tube 18 and the vent tube 14 together define a second annular passage coaxial with the body 3 and of smaller cross-section than the first passage, for conveying liquid from the bottle to the lock chamber A.

When the bottle is tipped to pour out measure of liquid, as illustrated in FIG. 2, then liquid from the bottle fills the hollow portion 16 of the syphon device and fills the annular dispensing chamber B within the body 3, from which the liquid pours out through the lower part of the annular pouring opening defined between the lip 6 and the cover plate 11, as indicated by black arrows in FIG. 1. A volume of air which is equal to the volume of liquid poured out enters the chamber B through the upper part of the pouring opening and enters the lock chamber A through the opening 13, as indicated by white arrows in FIG. 1. From the lock chamber A the air enters the bottle through the vent tube 14.

During this time a portion of the liquid also flows from the bottle through the second annular passage between the tubes 14 and 18 and from the chamber B through the opening 13, and starts to fill the lock chamber A. After a predetermined time the rising liquid in the lock chamber A cuts off the flow of air into the bottle through the vent tube 14 and, therefore, the pouring-out of the liquid: this occurs when the liquid in the chamber A reaches the end of the vent tube 14 within the chamber A.

The shape and size of the lock chamber A and the position of the vent tube 14 therein are such as to render the time taken for the partial filling of the chamber A necessary to block the vent tube 14 independent of the angle of tilt of the bottle, so that the lock chamber A acts as a timing device. Consequently the measure of liquid poured-out is always the same and is influenced neither by the angle of tilt of the bottle, nor by the orientation of the bottle about its axis (the closure device being symmetrical about its axis). Moreover, the measure dispensed is independent of the amount of liquid left in the bottle, provided, of course, this is always greater than the measure in question.

In the tilted pouring position (FIG. 2) after pouring-out of the liquid has ceased, air cannot enter the bottle, since any bubbles of air entering the chamber B are stopped by the wall 7 and collect within the body 3. Thus the measure of liquid poured-out cannot be influenced by the accidental ingress of air.

When the bottle is returned to the upright position after pouring-out of the measured quantity of liquid, the liquid which occupied the lock chamber A passes through the opening 13 into the chamber B and returns via the syphon device into the interior of the bottle, as indicated by the arrows in FIG. 1. Any drops of liquid which are left on the wall 7 will be poured-out directly when the next pouring-out operation takes place, without being able to return to the lock chamber A and affect the operation thereof.

The measuring and dispensing closure device described moreover renders any fraudulent filling of the bottle extremely difficult, since any attempt to introduce liquid from the outside into the closure device causes both the first passage for the liquid and also the vent tube 14 to be simultaneously obstructed, preventing the flow of air out of the bottle and therefore filling of the bottle.

Figure 3:
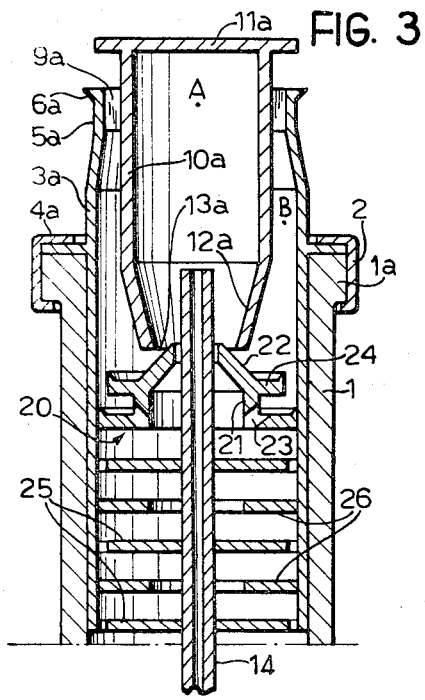
FIGS. 3, 4 and 5 are diagrammatic axial sections of closure devices according to three different variants of the embodiment of FIG. 1.

In the variant illustrated in FIG. 3, the measuring and dispensing closure device comprises a similar tubular body 3a having an annular flange 4a a lock chamber A having a cylindrical wall 10a closed at its outer end by a cover plate 11a and connected to a narrow portion 5a of the body 3a by means of radial guide vanes 9a. The vanes 9a define an annular array of apertures in the annular space between the portion 5a and the wall 10a. The lock chamber A is defined by the cylindrical wall 10a, which has at its inner end a frusto-conical portion 12a terminating in an opening 13a.

The interior of the bottle is separated from the dispensing chamber B by an intermediate annular wall 20 integral with a tubular wall 21 coaxially surrounding a vent tube 14 which passes with radial clearance through a frusto-conical portion 22 at the outer end of the wall 21, forming the second annular passage of the device. An annular external flange 24 is provided at the junction of the wall 21 and the larger diameter end of the frusto-conical portion 22.

The annular wall 20 has a number of holes 23 inclined to the axis of the tubular wall 21 at the junction between the said wall 21 and the annular wall 20, and forming part of the first annular passage of the device.

Inwardly of the wall 20 a series of parallel transverse diaphragms 25, integral with the vent tube 14, is provided. The diaphragms 25 alternate with other diaphragms 26 integral with the body 3 to create a labyrinth passage intended to prevent the entrance of air into the bottle during pouring.

Operation of the measuring and dispensing closure device of FIG. 3 is similar to that of the embodiment of FIGS. 1 and 2, except that recovery of the liquid from the dispensing chamber B is brought about by gravity through the holes 23. During pouring-out air cannot pass from the dispensing chamber B into the interior of the bottle because the labyrinth passage formed by the diaphragms 25 restricts the upward flow of air.

Figure 4:
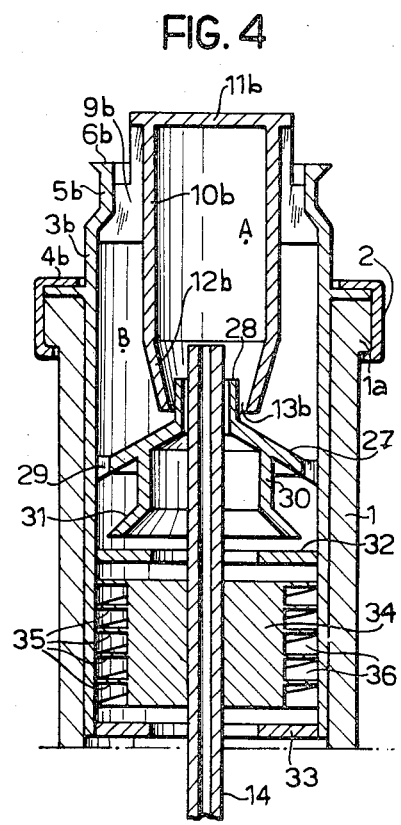

In the variant illustrated in FIG. 4 the measuring and dispensing closure device has a hollow body 3b with a narrow outer portion 5b having an external lip 6b. A lock chamber A is defined within a cylindrical wall 10b connected to the body 3b by radial guide vanes 9b; the lock chamber A is closed by a circular cover plate 11b and its cylindrical wall 10b terminates at its inner end in a frusto-conical inwardly tapering portion 12b having a central opening 13b coaxially surrounding a vent tube 14 with radial clearance.

A frusto-conical diaphragm 27 integral with the body 3b is located adjacent the opening 13b. At its wider end the diaphragm 27 has a number of openings 29 forming part of the first passage of the device and at its narrower end the diaphragm 27 is connected to a tubular portion 28 which surrounds the vent tube 14, penetrating partly into the lock chamber A through the opening 13b and forming the second annular passage. The diaphragm 27 has an axially inwardly projecting tubular portion 30 terminating in a flared mouth 31. Inwardly of the mouth 31 the body 3b is provided with two annular transverse walls 32 and 33, spaced apart axially, between which is situated a body 34 coaxial with the vent tube 14 provided with helicoidal guide vanes 35 defining a number of helical passages 36 between the body 34 and the internal surface of the hollow stopper body 3b. The passages 36 are designed to prevent the free passage of air into the bottle during pouring.

Figure 5:
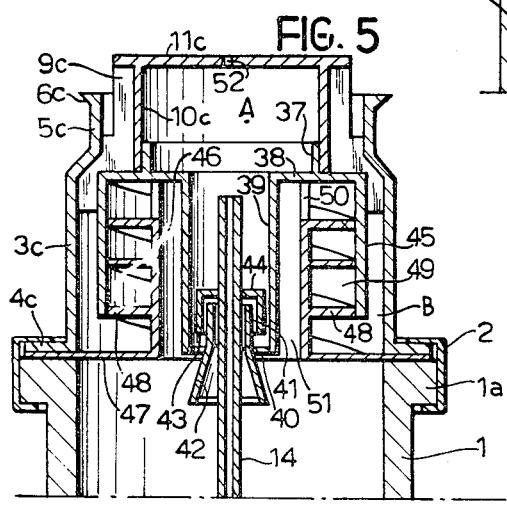

In the variant illustrated in FIG. 5, the closure device has a tubular body 3c provided with an annular flange 4c by which it is held on the neck 1 of a bottle, using a clip 2. The body 3c is disposed wholly outside the bottle, having an outer narrow portion 5c provided with a drip-catching lip 6c. A number of radial guide vanes 9c connects a cylindrical wall 10c of a lock chamber A to the body 3c, the wall 10c being coaxial with the body 3c and terminating at its outer end in a circular cover plate 11c having a central breather hole 52.

The inner end of the cylindrical wall 10c fits over an annular appendage 37 of an annular transverse wall 38 the radially inner edge of which is integral with a tubular portion 39 which coaxially surrounds a vent tube 14 and which terminates at its inner end in an internal annular flange 40. The flange 40 is connected to a tube 41 having a flared mouth 42 at its inner end, which projects into the bottle, beyond the flange 40. A short tubular element 43 is interposed between and coaxial with the tubular portion 39 and the tube 41, and is provided at its end remote from the flange 40 with a transverse diaphragm 44 fixed to the vent tube 14, thereby forming a syphon device which allows emptying and filling of the lock chamber A.

An annular dispensing chamber B is defined within the tubular body 3c between the internal surface of the latter and a coaxial tubular wall 45 integral with the radially outer edge of the transverse wall 38. The interior of the bottle is separated from the chamber B by an intermediate wall 47 the peripheral portion of which is clamped between the flange 4c of the body 3c and a rim 1a on the neck of the bottle. The intermediate wall 47 is integral with an intermediate tubular wall 46 interposed coaxially between the tubular wall 45 and the tubular portion 39 connected to the transverse wall 38. Between the tubular walls 45 and 46 there extend one or more helicoidal guide vanes 48, single or multi-start, which define one or more helical channels 49 which place the dispensing chamber B in communication with the annular space 51 between the tubular wall 46 and the tubular portion 39, by way of vents 50 in the tubular wall 46. The helical channels 49 define a syphon passage between the chamber B and the interior of the bottle, preventing flow of air into the bottle.

The syphon emptying of the lock chamber A is made possible by a breather opening 52 in the cover plate 11c of this chamber A. In this case, as in the previously described embodiments, the measuring and dispensing closure device prevents fraudulent refilling of the bottle by preventing the entry of liquid into the bottle from the outside even when the bottle is upright.

Figure 6:
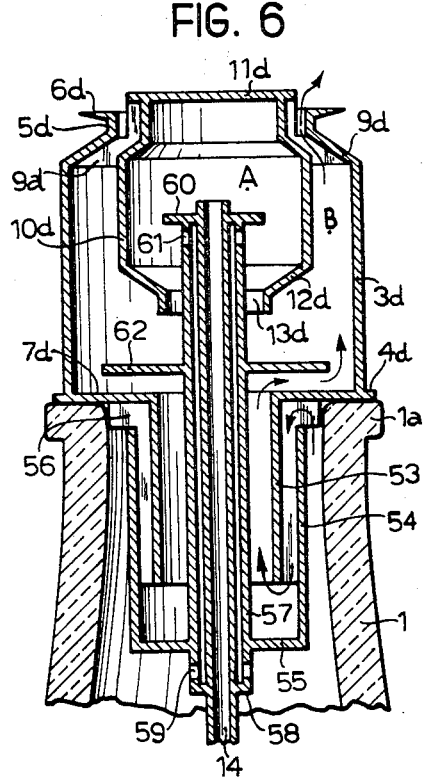
FIG. 6 is a diagrammatic axial section of a measuring and dispensing closure device for bottles according to another embodiment of the invention.

The measuring and dispensing closure device according to the embodiment illustrated in FIG. 6 comprises a tubular body 3d, having an annular transverse wall 7d adapted to be sealed on to the mouth of a bottle by known means. This body 3d has at its outer end a narrow portion 5d surmounted by a drip-catching lip 6d. A lock chamber A is defined within the body 3d by a cylindrical wall 10d, closed at its outer end by a cover plate 11d and connected by means of radial guide vanes 9d to the narrow portion 5d. The vanes 9d form an annular array of openings communicating with a dispensing chamber B defined between the cylindrical wall 10d and the internal surface of the hollow body 3d. The wall 10d has at its inner end a radially inwardly tapering portion 12d terminating in an annular opening 13d coaxially surrounding a vent tube 14 which extends into the bottle along the axis thereof.

The annular wall 7d is connected to an intermediate tubular element 53 which extends out into the bottle coaxially with the vent tube 14. The tubular element 53 is itself surrounded coaxially by an outer tubular element 54, closed at its inner end by a transverse diaphragm 55. The two tubular elements 53 and 54 are connected together by radial fins 56 and they form a syphon device through which liquid from the bottle passes into the dispensing chamber B and thence to the outlet openings between the guide vanes 9d. On the inside of the said syphon device is placed a small tube 57, which surrounds coaxially the vent tube 14, and is closed at its outer and inner ends by two diaphragms, 60 and 58 respectively connecting the tube 57 to the tube 14. Next to each diaphragm 60, 58 there is placed a ring of radial openings 61, 59 respectively which allow the liquid held in the bottle to reach the lock chamber A directly, without being affected by other liquid or air flows.

The outer diaphragm 60, placed near the outer end of the vent tube 14, projects radially beyond the outer diameter of the tube 57, so as to shield the entry of air against liquid entering the lock chamber A. The openings 61 adjacent the outer diaphragm 60 also ensure a more uniform filling of the lock chamber A independently of the degree of filling of the bottle and of its angle of tilt.

The tube 57 has intermediate its ends an external annular flange 62, situated within the dispensing chamber B, with the purpose of diverting liquid from the entrance opening 13d of the lock chamber A in the pouring-out phase and of avoiding interference between the two currents of liquid.

Figure 7:
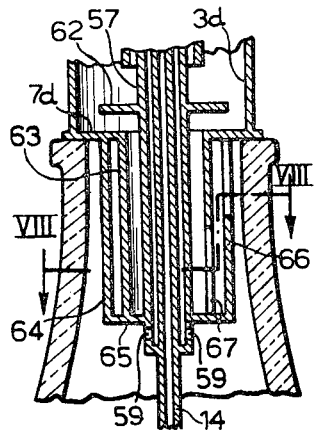
FIG. 7 is a diagrammatic partial axial section of a closure device according to a variant of the embodiment of FIG. 6.
Figure 8:
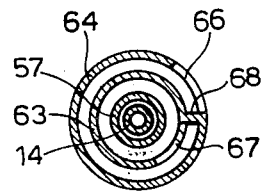
FIG. 8 is a cross section taken along the line VIII—VIII of FIG. 7.

In the embodiment illustrated in FIGS. 7 and 8 the transverse wall 7d of the hollow body 3d is connected to inner and outer coaxial tubular elements 63 and 64 both closed by one single inner end wall 65, which is also connected to the tube 57 surrounding the vent tube 14. Two radial apertures 66, 67 are provided, in axially staggered relation, in the tubular elements 64, 63 respectively. The apertures 66, 67 are separated by a radially and axially extending partition 68 (FIG. 8) so as to form a spiral labyrinth passage which takes the place of the syphon device previously mentioned, thereby forming an air lock when the lock chamber A is full.

Figure 9:
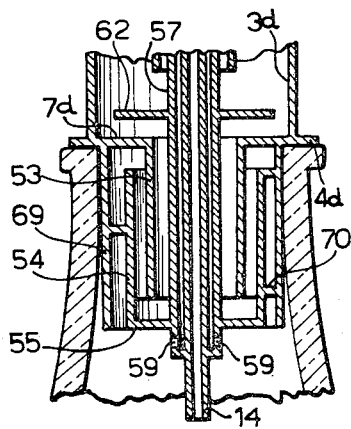
FIG. 9 is a diagrammatic partial axial section of a closure device according to another variant of the embodiment of FIG. 6.

In the variant of the embodiment of FIGS. 7 and 8 illustrated in FIG. 9 the transverse wall 7d of the hollow body 3d is connected, as in the embodiment of FIGS. 6, to a tubular element 53 which is coaxial with and surrounds the two tubes 14, 57; a second tubular element 54, closed at its inner end by an end wall 5, coaxially surrounds the tubular element 53 and forms therewith an inner syphon device. The two elements 53, 54 are surrounded coaxially by a further tubular element 69 connected to the transverse wall 7d and open at its inner end. Between the outermost tubular element 69 and the tubular element 54 which is immediately enclosed therein, a helicoidal wall 70 is disposed. The wall 70 forms a spirally shaped labyrinth combined with the radially inner syphon device. This embodiment of the invention is particularly advantageous for dispensing measured quantities with slight tilting of the bottle.

In each one of the operational embodiments herein described the closure device according to the invention has the main requirements needed for satisfactory operation: that is, it dispenses consistently equal predetermined measures. The measure dispensed is unaffected by the tilt of the bottle, by the amount of liquid which remains in the said bottle (provided of course this exceeds the volume of said measure), and by the direction of the tilt and speed of emptying of the lock chamber, thereby allowing successive measures to be poured out with the greatest possible frequency.

I claim:

1. A liquid measuring and dispensing bottle closure device comprising a body adapted to fit into the neck of a bottle and provided with a pouring opening, a first passage in the body for connecting the interior of the bottle with said pouring opening, a second passage of smaller cross section than the first passage for connecting the interior of said bottle with a lock chamber, whereby during pouring the liquid flows into the lock chamber and also through the pouring opening, until the liquid which collects in the lock chamber closes off a vent tube, preventing further air from entering the bottle, and means preventing flow of air into the bottle through the first passage, wherein the improvement consists in that:
 a. said body is axially symmetrical;
 b. said vent tube is coaxial with said body;
 c. said lock chamber is coaxial with the vent tube and communicates with said first passage connected to the pouring opening by means of an annular aperture which coaxially surrounds said vent tube;
 d. said first and second passages are annular and coaxial with said body, and
 e. said means for preventing the flow of air into the bottle through the first passage are disposed in the annular space enclosed between said body and said vent tube.

2. Bottle closure device as claimed in claim 1, wherein said lock chamber communicates with the atmosphere during pouring of liquid from the bottle through part of a liquid dispensing chamber, which forms part of the said first passage, adjacent said annular pouring opening.

3. Bottle closure device as claimed in claim 1, including a syphon device in said body through which the interior of the bottle and the pouring opening communicate.

4. Bottle closure device as claimed in claim 3, wherein the syphon device is constituted by helicoidal vanes defining at least one passage and adapted to prevent the direct entry of air into the bottle during pouring-out of liquid.

5. Bottle closure device as claimed in claim 1, wherein the means for preventing the flow of air into the bottle through the first passage consist of a plurality of transverse diaphragms integral with the body.

6. Bottle closure device as claimed in claim 1, including at least one transverse diaphragm having therein openings through which liquid may pass in both directions under the influence of gravity, said diaphragm separating the interior of the bottle from a liquid dispensing chamber forming part of the first passage.

7. Bottle closure device as claimed in claim 1, including syphon passages coaxial with the vent tube through which emptying and filling of the lock chamber take place.

8. Bottle closure device as claimed in claim 1, including a second tube, coaxially surrounding the vent tube, for conveying liquid into the lock chamber, a transverse diaphragm defining part of a labyrinth passage, included in said first passage, through which liquid from the bottle passes in the pouring phase, respective diaphragms closing said second tube at its two ends, and means defining respective rings of radial openings near said diaphragms, said openings being situated respectively near the outer end of the vent tube and near said transverse labyrinth passage-defining diaphragm.

9. Bottle closure device as claimed in claim 8, wherein said second tube surrounding the vent tube is provided intermediate its ends with an external annular flange adapted to protect the lock chamber from inflow of the poured-out liquid.

10. Bottle closure device as claimed in claim 8, a transverse wall at the inner end of a dispensing chamber forming part of the first passage, and a syphon device integral with said transverse wall.

11. Bottle closure device as claimed in claim 8, including a dispensing chamber in said first passage, a transverse wall at the inner end of said dispensing chamber, said labyrinth passage being defined in a tubular body integral with said transverse wall and housing two coaxial tubular elements having apertures at different axial positions with a radially and axially extending partition separating said apertures in the annular space between said tubular elements.

12. Bottle closure device as claimed in claim 8, including a dispensing chamber in said first passage, a transverse wall at the inner end of said dispensing chamber, a syphon device integral with said transverse wall and a spiral labyrinth passage combined with said syphon device.

* * * * *